(12) United States Patent
Mon Divakaran et al.

(10) Patent No.: US 12,519,808 B2
(45) Date of Patent: Jan. 6, 2026

(54) SYSTEMS AND METHODS FOR DETECTING MALICIOUS ACTIVITY ON A WEB SERVER

(71) Applicant: Acronis International GmbH, Schaffhausen (CH)

(72) Inventors: Dinil Mon Divakaran, Singapore (SG); Candid Wüest, Bassersdorf (CH); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 265 days.

(21) Appl. No.: 18/494,065

(22) Filed: Oct. 25, 2023

(65) Prior Publication Data

US 2025/0141887 A1   May 1, 2025

(51) Int. Cl.
*H04L 9/00* (2022.01)
*G06F 11/14* (2006.01)
*H04L 9/40* (2022.01)

(52) U.S. Cl.
CPC ...... *H04L 63/1416* (2013.01); *G06F 11/1464* (2013.01); *H04L 63/20* (2013.01); *G06F 2201/84* (2013.01)

(58) Field of Classification Search
CPC .. H04L 63/1416; H04L 63/20; G06F 11/1464; G06F 2201/84; G06F 11/1451
See application file for complete search history.

(56) References Cited

U.S. PATENT DOCUMENTS

| | | | | |
|---|---|---|---|---|
| 10,764,313 | B1 * | 9/2020 | Mushtaq | G06N 20/00 |
| 11,960,603 | B2 * | 4/2024 | Bhave | G06F 21/552 |
| 2016/0191548 | A1 * | 6/2016 | Smith | G06F 21/554 |
| | | | | 726/23 |
| 2023/0344868 | A1 * | 10/2023 | Kaligotla | H04L 63/1416 |

OTHER PUBLICATIONS

Hostedscan, "Identify and manage your cyber vulnerabilities in one platform," HostedScan, LLC, 2019-2023, pp. 1-7.
Jfrog, "Innovate More . . . Remediate Less With DevOps-Centric Security," AI/ML, DevOps, and Security Features, 2023, pp. 1-6.
(Continued)

*Primary Examiner* — Syed M Ahsan
(74) *Attorney, Agent, or Firm* — ArentFox Schiff LLP; Michael Fainberg

(57) ABSTRACT

Disclosed herein are systems and method for detecting malicious activity on a web server. A method may include: retrieving a first backup and a second backup of a web server from a backup archive that stores a plurality of backups of the web server, wherein the first backup was generated at a first time and the second backup was generated at a second time; detecting at least one change between the first backup and the second backup; determining whether the at least one change is associated with malicious activity based on a plurality of security rules and a plurality of machine learning models and a severity of the malicious activity; and in response to determining that the severity is greater than a threshold severity, executing a rollback function of the web server to a backup that does not include the malicious activity.

19 Claims, 4 Drawing Sheets

(56) References Cited

OTHER PUBLICATIONS

Kasturi et al., "Mistrust Plugins You Must: A Large-Scale Study Of Malicious Plugins In WordPress Marketplaces," In: Proc. 31st USENIX Security Symposium, Aug. 10-12, 2022, pp. 161-178.

Lin et al., "Phishpedia: A Hybrid Deep Learning Based Approach to Visually Identify Phishing Webpages," In: Proc. 30th USENIX Security Symposium, Aug. 11-13, 2021, pp. 3793-3810.

Liu et al., "Inferring Phishing Intention via Webpage Appearance and Dynamics: A Deep Vision Based Approach," In: Proc. 31st USENIX Security Symposium, Aug. 10-12, 2022, pp. 1633-1650.

Van Den Hout et al., "LogoMotive: detecting logos on websites to identify online scams," SIDN Labs, In: Proc. PAM 2022, pp. 1-2.

\* cited by examiner

300

302 — Input the file in a fourth machine learning model configured to determine whether a the file comprises an authentic logo 304 — Input an output of the fourth machine learning model in the third machine learning model

402 — Input the file in a fifth machine learning model configured to determine whether a the file comprises malicious binaries 404 — Input an output of the fifth machine learning model in the third machine learning model

502 — Identify a webpage associated with the file corresponding to the at least one change 504 — Execute the webpage in a sandbox 506 — Determine a verdict of whether the webpage comprises malicious activity 508 — Input the verdict in the third machine learning model

FIG. 5

SYSTEMS AND METHODS FOR DETECTING MALICIOUS ACTIVITY ON A WEB SERVER

FIELD OF TECHNOLOGY

The present disclosure relates to the field of data security, and, more specifically, to systems and methods for detecting malicious activity on a web server.

BACKGROUND

Modern websites are built using templates, themes, plugins, etc., which make it easy to construct a website quickly and with minimal expertise. However, these common structures also expose the web server of a given website to a number of vulnerabilities. Attacks on web servers include SQL injections, cross-site scripting, website hijacking to set up phishing pages, etc. As web servers are continuously updated, there is a need for a robust security system for web servers.

Conventional solutions deploy a number of rules to detect potential vulnerabilities and exploit attempts on a web server. For example, one solution is a Web Application Firewall (WAF) that blocks certain network traffic if it matches a given regular expression. Another solution is an access control list that prevents new files from being written. Newer solutions propose the use of machine learning to tackle the attacks. However, all of these solutions run directly on the web server or in the network path in front of the web server-limiting the capability so as to not cause any performance degradation.

SUMMARY

In one exemplary aspect, the techniques described herein relate to a method for detecting malicious activity on a web server, the method including: retrieving a first backup and a second backup of a web server from a backup archive that stores a plurality of backups of the web server, wherein the first backup was generated at a first time and the second backup was generated at a second time; detecting at least one change between the first backup and the second backup; determining whether the at least one change is associated with malicious activity based on a plurality of security rules and a plurality of machine learning models, by: determining a rule verdict on whether the at least one change violates one or more of the plurality of security rules; inputting a file corresponding to the at least one change in a first machine learning model configured to verify whether an input change originates from an authorized channel; inputting the file in a second machine learning model configured to verify if a webpage associated with the file is a phishing webpage; inputting the rule verdict, an output of the first machine learning model, and an output of the second machine learning model into a third machine learning model configured to generate a severity of malicious activity on the web server; and in response to determining that the severity is greater than a threshold severity, executing a rollback function of the web server to a backup that does not include the malicious activity.

In some aspects, the techniques described herein relate to a method, wherein the file is an image, and wherein determining whether the at least one change is associated with the malicious activity further includes: inputting the file in a fourth machine learning model configured to determine whether the file includes an authentic logo; and inputting an output of the fourth machine learning model in the third machine learning model.

In some aspects, the techniques described herein relate to a method, wherein determining whether the at least one change is associated with the malicious activity further includes: inputting the file in a fifth machine learning model configured to determine whether the file includes malicious binaries; and inputting an output of the fifth machine learning model in the third machine learning model.

In some aspects, the techniques described herein relate to a method, wherein the web server includes a plurality of websites, wherein each of the plurality of websites includes one or more web pages, and wherein the first backup and the second backup include files of a specific website of the plurality of websites.

In some aspects, the techniques described herein relate to a method, wherein detecting at least one change between the first backup and the second backup further includes executing a sixth machine learning model that detects changes across one or more input backups.

In some aspects, the techniques described herein relate to a method, wherein detecting at least one change between the first backup and the second backup includes: detecting that a hash value of the file in the first backup differs from a hash value of the file in the second backup.

In some aspects, the techniques described herein relate to a method, wherein detecting at least one change between the first backup and the second backup includes: detecting that a file version number of the file in the first backup differs from a file version number of the file in the second backup.

In some aspects, the techniques described herein relate to a method, further including: identifying a webpage associated with the file corresponding to the at least one change; executing the webpage in a sandbox; determining a verdict of whether the webpage includes malicious activity; and inputting the verdict in the third machine learning model.

In some aspects, the techniques described herein relate to a method, wherein the web server is part of a plurality of web servers, further including: identifying each web server of the plurality of web servers that includes the file; and executing the rollback function on each of the plurality of web servers.

It should be noted that the methods described above may be implemented in a system comprising a hardware processor. Alternatively, the methods may be implemented using computer executable instructions of a non-transitory computer readable medium.

In some aspects, the techniques described herein relate to a system for detecting malicious activity on a web server, including: at least one memory; at least one hardware processor coupled with the at least one memory and configured, individually or in combination, to: retrieve a first backup and a second backup of a web server from a backup archive that stores a plurality of backups of the web server, wherein the first backup was generated at a first time and the second backup was generated at a second time; detect at least one change between the first backup and the second backup; determine whether the at least one change is associated with malicious activity based on a plurality of security rules and a plurality of machine learning models, by: determining a rule verdict on whether the at least one change violates one or more of the plurality of security rules; inputting a file corresponding to the at least one change in a first machine learning model configured to verify whether an input change originates from an authorized channel; inputting the file in a second machine learning model configured to verify if a webpage associated with the file is a phishing webpage; inputting the rule verdict, an output of the first machine learning model, and an output of the second machine learning model into a third machine learning model configured to generate a severity of malicious activity on the web server; and in response to determining that the severity is greater than a threshold severity, execute a rollback function of the web server to a backup that does not include the malicious activity.

In some aspects, the techniques described herein relate to a non-transitory computer readable medium storing thereon computer executable instructions for detecting malicious activity on a web server, including instructions for: retrieving a first backup and a second backup of a web server from a backup archive that stores a plurality of backups of the web server, wherein the first backup was generated at a first time and the second backup was generated at a second time; detecting at least one change between the first backup and the second backup; determining whether the at least one change is associated with malicious activity based on a plurality of security rules and a plurality of machine learning models, by: determining a rule verdict on whether the at least one change violates one or more of the plurality of security rules; inputting a file corresponding to the at least one change in a first machine learning model configured to verify whether an input change originates from an authorized channel; inputting the file in a second machine learning model configured to verify if a webpage associated with the file is a phishing webpage; inputting the rule verdict, an output of the first machine learning model, and an output of the second machine learning model into a third machine learning model configured to generate a severity of malicious activity on the web server; and in response to determining that the severity is greater than a threshold severity, executing a rollback function of the web server to a backup that does not include the malicious activity.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3 illustrates a flow diagram of a method for detecting malicious activity on a web server using an additional machine learning model that assesses logos.

FIG. 4 illustrates a flow diagram of a method for detecting malicious activity on a web server using an additional machine learning model that detects malicious binaries.

FIG. 5 illustrates a flow diagram of a method for detecting malicious activity on a web server using a sandbox execution.

DETAILED DESCRIPTION

Exemplary aspects are described herein in the context of a system, method, and computer program product for detecting malicious activity on a web server. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

As discussed previously, there is a need for verifying whether modifications to a web server are normal and done by an authorized administrator or are exploits and cause security compromises. The present disclosure describes systems and methods that leverage web server backup archives for the detection of vulnerabilities and changes in a web server.

Figure 1:
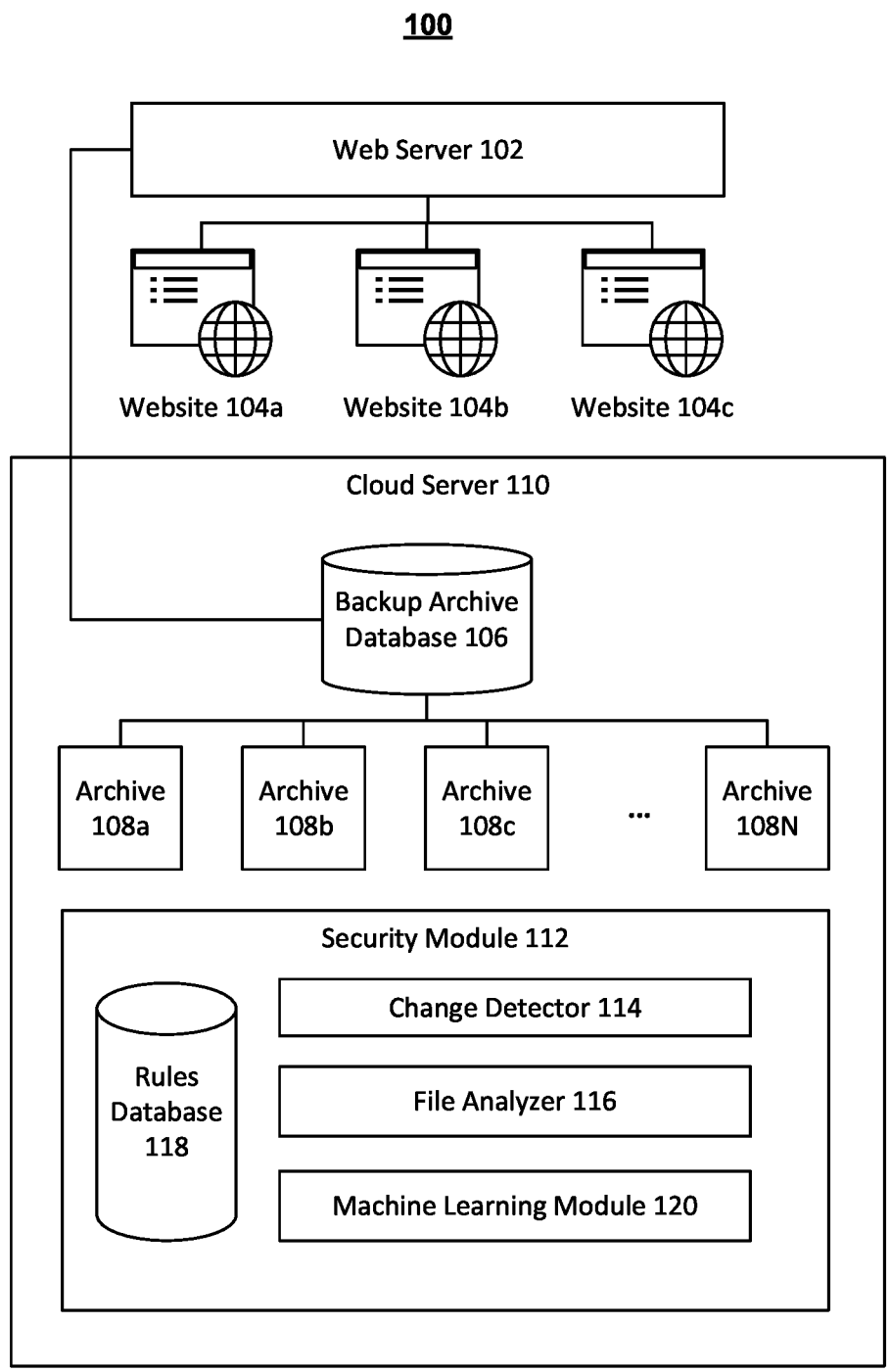
FIG. 1 is a block diagram illustrating a system for detecting malicious activity on a web server.

Web server 102 is a computer system running a web server software (e.g., Apache HTTP, Microsoft Internet Information Service (IIS), etc.) that hosts one or more websites 104. Websites 104a, 104b, and 104c may each include a plurality of webpages. Although only three websites are shown in FIG. 1, one skilled in the art will appreciate that web server 102 may host any number of websites. Certain web servers may be dedicated hosts that each host websites for a single user (e.g., a company), whereas other web servers may be shared hosts that each host websites for multiple different users.

In terms of a communication path, a web client on a computing device (e.g., a smartphone) may initiate and transmit an HTTP request to web server 102 (e.g., to access a webpage of website 104a), which provides an HTTP response. In some aspects, web server 102 may retrieve a webpage from a static database or may transmit a servlet request to an application server, which performs processing (e.g., runs a Java application) and returns a servlet response.

Conventional web application scanners may scan the source code of a web application as well as installed plugins for vulnerabilities. Such tools use an active scan of the web server 102 or, if access is granted, scan the source code of the web application from a source code repository. This approach will miss any file that is not part of the code repository. The approach also uses significant processing and memory resources of web server 102.

The systems and methods of the present disclosure execute security module 112, which works on a backup archive of web server 102, and therefore does not affect the performance of server 102. The systems and methods further leverage cloud computational resources to carry out the detection of vulnerabilities and exploits with in-depth scans.

In an exemplary aspect, security module 112 may be stored on cloud server 110. In some aspects, cloud server 110 may be an application server. A backup of web server 102 may be generated and stored in backup archive database 106 (e.g., using a backup software). Security module 112 retrieves the past N archives (e.g., archive 108a, 108b, 108c, ... 108N) of web server 102 from a backup archive database 106 and checks for changes in files or a file system structure using change detector 114. This can be done using hashing techniques or indexes from incremental backups. If there are no changes, no further action is needed. If a change is detected, security module 112 may analyze the changes using file analyzer 116. The number of backup archives to analyze is limited only by the computational resources that are available by cloud server 110. For example, N may be a large number if resources are not a limited constraint.

In particular, the changes in web server 102 files are scrutinized using a combination of pre-defined rules stored in rules database 118 and machine learning models executed by machine learning module 120 for detecting potential vulnerabilities and breaches. File analyzer 116 uses rules to detect known vulnerabilities of components. For example, for any new files and plugins installed, their vulnerabilities are looked up via database 118. For this, file analyzer 116 may identify a version number and/or file hash of a changed file. The version number is then compared to the vendors list of available patches. The files may also be passed to an antivirus scanner for additional screening.

Multiple machine learning (ML) models are used for different purposes. One ML model executed by machine learning module 120 may analyze the changes in backup files and file system structure, and if there are many changes, as determined by a predefined threshold, an alarm is triggered indicating an anomaly. This model can also be linked to a change management tool to verify if the changes were done through authorized channels (e.g., Jira Ticket and GitHub push).

Another ML model of machine learning module 120 analyzes the changes in contents (e.g., text, forms, etc.) and detects potential hijacking of a website and repurposing for other attacks. This helps to detect, for example, Magecart/Formjacking attacks where the content of webforms is stolen with a script. This can also be used to detect web shells, which allow attacks to access the system where web server 102 runs on.

Another ML model of machine learning module 120, trained specifically to classify a webpage as phishing or not, is used to detect if a webpage functions as a phishing page. Similarly, another AI model of machine learning module 120 trained on logos of well-known brands, is part of the system to detect if the new images are imitating any well-known brands.

Another ML model of machine learning module 120 analyzes the different file types and detects malicious binaries. Such malicious binaries may be further analyzed by executing in a specialized sandbox. This helps to detect if malware is staged at the website as part of other attacks.

In some aspects, security module 112 further spins the latest version of the web server 102 (which has most changes in the archive) in a cloud sandbox to further analyze dynamically rendered contents, to carry out password breaking tests, penetration tests, application scans, fuzz tests, etc.

Security module 112 subsequently reports the detected vulnerabilities and exploits. This can be done via a user interface provided to the developer of an infected website and/or to the user requesting to access an infected website. In some aspects, the reports are transmitted by security module 112 by sending emails or other notifications or by triggering an internal process through an API call.

In some aspects, if the severity of detected vulnerabilities and exploits is higher than a threshold as determined by security module 112, security module 112 may execute a rollback of web server 102 such that it functions safely using a previous secure version captured in backup archive database 106.

In some aspects, security module 112 may monitor multiple web servers. In particular, security module 112 may cluster web servers based on the sector (e.g., retail, clinics, etc.). When identifying anomalies, security module 112 may compare the files of one web server with the other web servers. This may help highlight potential deviations caused by malicious activity. For example, if ten web servers each host websites from a single user (e.g., a company with one website) and one web server is infected, security module 112 may identify the infection-causing files by comparing the backups of the infected web server with the non-infected web servers.

Figure 2:
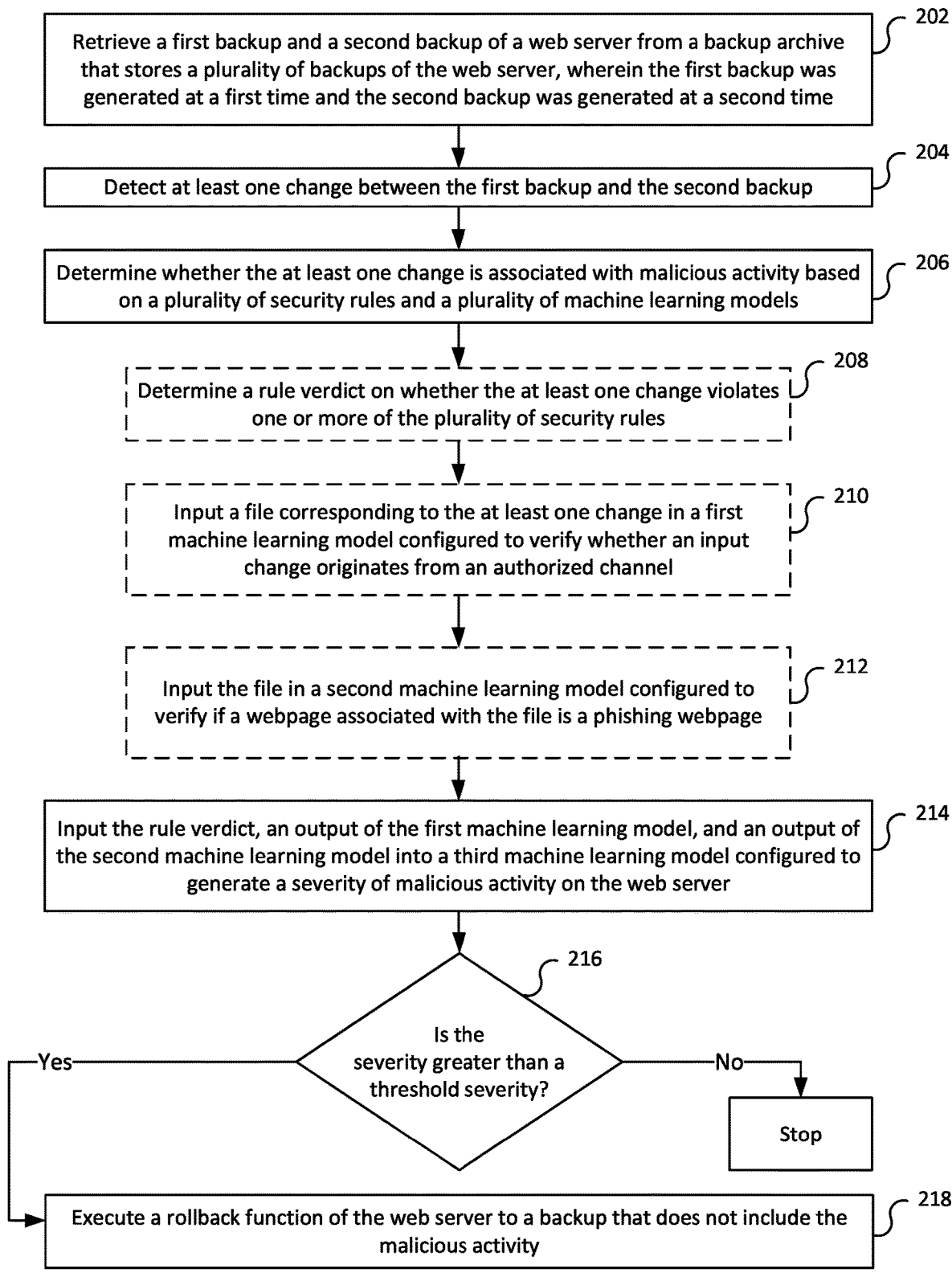
FIG. 2 illustrates a flow diagram of a method for detecting malicious activity on a web server.

FIG. 2 illustrates a flow diagram of a method 200 for detecting malicious activity on a web server.

At 202, security module 112 retrieves a first backup and a second backup of a web server from a backup archive that stores a plurality of backups of the web server, wherein the first backup was generated at a first time (e.g., before an update of the web server) and the second backup was generated at a second time (e.g., after an update of the web server). For example, security module 112 security module 112 may retrieve archive 108a and archive 108b of web server 102 from backup archive database 106. In some aspects, web server 102 hosts a plurality of websites including website 104a, website 104b, website 104c, etc. In some aspects, each backup may be specifically for a specific website. For example, archive 108a and archive 108b may solely include files associated with website 104a.

At 204, security module 112 detects at least one change between the first backup and the second backup. In some aspects, when detecting at least one change between the first backup and the second backup security module 112 executes a machine learning model that detects changes across one or more input backups. For example, the machine learning model may be a one-class support vector machine that is trained to detect file changes that deviate from a plurality of default files associated with the web server. The machine learning model may output a plurality of differences between two sets of files, where the first set includes files from the first backup and serves as the plurality of default files and the second set includes files from the second backup and serves as the set to check for deviations. In some aspects, the plurality of differences may be a matrix that includes a first ordered column listing files from the first backup, a second ordered column listing files from the second backup that match the files in the first ordered column, and a third column that indicates whether a change exists. An example of this matrix is shown below:

| | | |
|---|---|---|
| File 123 | File 123 | Changed |
| File 124 | File 124 | — |
| File 125 | — | Changed |

In this example, file 123 is in both the first backup and the second backup, but the contents of the files do not match. Accordingly, the third column indicates "changed." File 124 is also found in both backups, but the machine learning model may determine that the files are identical. File 125 is found in the first backup, but is not found in the second backup. This may indicate that the file 125 was deleted or modified in a manner that makes it unrecognizable in the second backup. Accordingly, the third column indicates that file 125 is a difference (i.e., "changed") between the two backups.

In some aspects, when detecting at least one change between the first backup and the second backup, security module 112 detects that a hash value of the file in the first backup differs from a hash value of the file in the second backup. For example, security module 112 may determine hash values for each of the files in each backup. Examples of hash functions that may be applied by security module 112 include, but are not limited to, secure hash algorithm (SHA), cyclic redundancy check (CRC), MurmurHash, and BLAKE2. Security module 112 may then compare the hash values of the respective files. For any files that do not have matching hash values in both backups, security module 112 may identify those files as changes.

In some aspects, when detecting at least one change between the first backup and the second backup, security module 112 detects that a file version number of the file in the first backup differs from a file version number of the file in the second backup. In some aspects, a file version number is a 64-bit number that holds the version number for a file. For any given file in the first backup and the second backup, security module 112 may detect a change if the version number has changed for a file.

At 206, security module 112 determines whether the at least one change is associated with malicious activity based on a plurality of security rules and a plurality of machine learning models. It should be noted that step 206 involves executing steps 208, 210, and 212.

At 208, security module 112 determines a rule verdict on whether the at least one change violates one or more of the plurality of security rules. For example, the plurality of security rules may be in rules database 118. In some aspects, a rule may be associated with a particular file or a particular file type (e.g., text, image, plugin, etc.). For example, a certain file may be needed to load a home page of a website. A rule associated with the file may indicate that the file cannot be encrypted. Suppose that the file is encrypted in the second backup. Security module 112 may determine that the change (i.e., the encryption) violates the rule. In another example, a rule may indicate that file used for a security feature cannot be modified or disabled. Suppose that the file is not detected in the second backup. Security module 112 may determine that the change (i.e., the deletion) violates the rule. The rules verdict may be a matrix that lists each applicable rule to the at least one change in one column and whether the rule was violated in a second column.

In some aspects, rule database 118 stores a rules for a plurality of websites. The rules for one website may differ from the rules for another website even though both websites are on the same website. Accordingly, security module 112 may retrieve rules based on the website that the at least one change is for and based on the file type and/or file associated with the change.

At 210, security module 112 inputs a file corresponding to the at least one change in a first machine learning model configured to verify whether an input change originates from an authorized channel. For example, the first machine learning model may verify whether a change is authentic and found in platforms such as Jira Ticket and GitHub push. If the change is found in such software development platforms, as is normally the case for certain updates, the change is deemed authentic. The first machine learning model may be a classifier that is trained based on web crawled update submissions on verified software development platforms (i.e., authorized channels). The first machine learning model may output a matrix that lists each of the at least one change in one column and whether the change is verified by an authorized channel in a second column.

At 212, security module 112 inputs the file in a second machine learning model configured to verify if a webpage associated with the file is a phishing webpage. The second machine learning model may be a classifier trained on a plurality of websites, each tagged as "phishing" or "non-phishing." For example, the second machine learning model may be a deep learning model that learns the features of a phishing webpage and a non-phishing webpage. Accordingly, the second machine learning model may receive the webpages associated with a website where the at least one change is applied, and may output a "phishing" or "non-phishing" class for the website. In some aspects, the second machine learning model may output a class for each webpage. If even one webpage is classified as "phishing," the website of the webpage may be classified as "phishing."

At 214, security module 112 inputs the rule verdict, an output of the first machine learning model, and an output of the second machine learning model into a third machine learning model configured to generate a severity of malicious activity on the web server. For example, the third machine learning model may execute a classification algorithm that receives the matrices described above and outputs a severity. In some aspects, the severity is a class such as one of "very low," "low," "medium," "high, "very high." The severity represents a likelihood (e.g., a probability) of the change being malicious activity. In some aspects, the severity may be represented as a quantity (e.g., a number between 0-100) that represents the likelihood.

At 216, security module 112 determines whether the severity is greater than a threshold severity. For example, the threshold severity may be a qualitative cut-off such as "medium" or a quantitative cut-off such as "75." If the severity is greater than "medium" (e.g., "high," "very high") or "75" (e.g., 80), the at least one change is deemed as malicious activity.

In response to determining that the severity is greater than a threshold severity, method 200 advances to 218, where security module 112 executes a rollback function (e.g., recovery function) of the web server to a backup that does not include the malicious activity. For example, security module 112 may determine that the first backup does not include any malicious activity and may execute a recovery on web server 102 to return to the state captured in the first backup. In some aspects, security module 112 may further generate an alert indicating that the malicious activity was detected and may only perform recovery when approved by an administrator of web server 102 and/or the website with the malicious activity.

In some aspects, if the web server hosts multiple websites, security module 112 may analyze the backups associated with the other websites. Because a recovery function may involve a brief outage of web server 102, security module 112 may request approval of the recovery function, via a generated user interface, on computing devices of all administrators of the websites hosted on web server 102. The recovery may only be performed when security module 112 receives approval from a majority of the administrators. In some aspects, security module 112 may further confirm whether there exists at least one back up web server that can receive requests in place of web server 102. If none exist, security module 112 may only execute the recovery when all administrators approve the recovery. During the wait for approval, security module 112 may quarantine the files associated with malicious activity and block access to the infected webpages. Furthermore, security module 112 may redirect users requesting access to the webpage to a different webpage indicating that the webpage is undergoing maintenance.

In some aspects, web server 102 is part of a plurality of web servers. Subsequent to step 218, security module 112 may identify each web server of the plurality of web servers that comprises the file and may execute the rollback function on each of the plurality of web servers. Accordingly, the analysis of changes and malicious activity is only performed once and the results are applied to all other web servers that share the infected webpage(s).

If the severity is not greater than the threshold severity, security module 112 may end method 200. In some aspects, security module 112 may also generate a record indicating that an analysis of the backups was performed and store the results in a database. This prevents security module 112 from re-analyzing clean backups and helps keep a record of infected backups.

FIG. 3 illustrates a flow diagram of a method 300 for detecting malicious activity on a web server using an additional machine learning model that assesses logos. For example, the file discussed in method 200 may be an image. When determining whether the at least one change is associated with the malicious activity in step 206, at 302, security module 112 further inputs the file in a fourth machine learning model configured to determine whether the file comprises an authentic logo. In some aspects, the fourth machine learning model may be a part of the second machine learning model as many phishing websites attempt to model images after authentic logos to gain trust of unsuspecting users. If an authentic logo is detected in a web page that is likely a phishing web page, the likelihood of malicious activity increases. At 304, security module 112 inputs an output of the fourth machine learning model in the third machine learning model. In this aspect, the third machine learning model is trained on another input (i.e., the authenticity of logos in a web page) and factors this input into the severity calculation. This input may be a matrix that lists the detected authentic logos (if any).

FIG. 4 illustrates a flow diagram of a method 400 for detecting malicious activity on a web server using an additional machine learning model that detects malicious binaries. When determining whether the at least one change is associated with the malicious activity at step 206, at 402, security module 112 inputs the file in a fifth machine learning model configured to determine whether the file comprises malicious binaries. At 404, security module 112 inputs an output of the fifth machine learning model in the third machine learning model. In this aspect, the third machine learning model is trained on another input (i.e., the presence of malicious binaries) and factors this input into the severity calculation. This input may be a matrix that lists the binaries (if any).

FIG. 5 illustrates a flow diagram of a method 500 for detecting malicious activity on a web server using a sandbox execution. At 502, security module 112 identifies a webpage associated with the file corresponding to the at least one change. At 504, security module 112 executes the webpage in a sandbox. For example, the sandbox may be a virtual machine on a cloud computing device. The execution may provide insight of the issues a user accessing the web page would come across such as the generation of malicious artifacts. For example, the sandbox execution may reveal that generating the webpage causes a malicious script to be automatically downloaded. At 506, security module 112 determines a verdict of whether the webpage comprises malicious activity. At 508, security module 112 inputs the verdict in the third machine learning model. In this aspect, the third machine learning model is trained on another input (e.g., the presence of malicious artifacts) and factors this input into the severity calculation. This input may be matrix that lists the malicious artifacts (if any).

Figure 6:
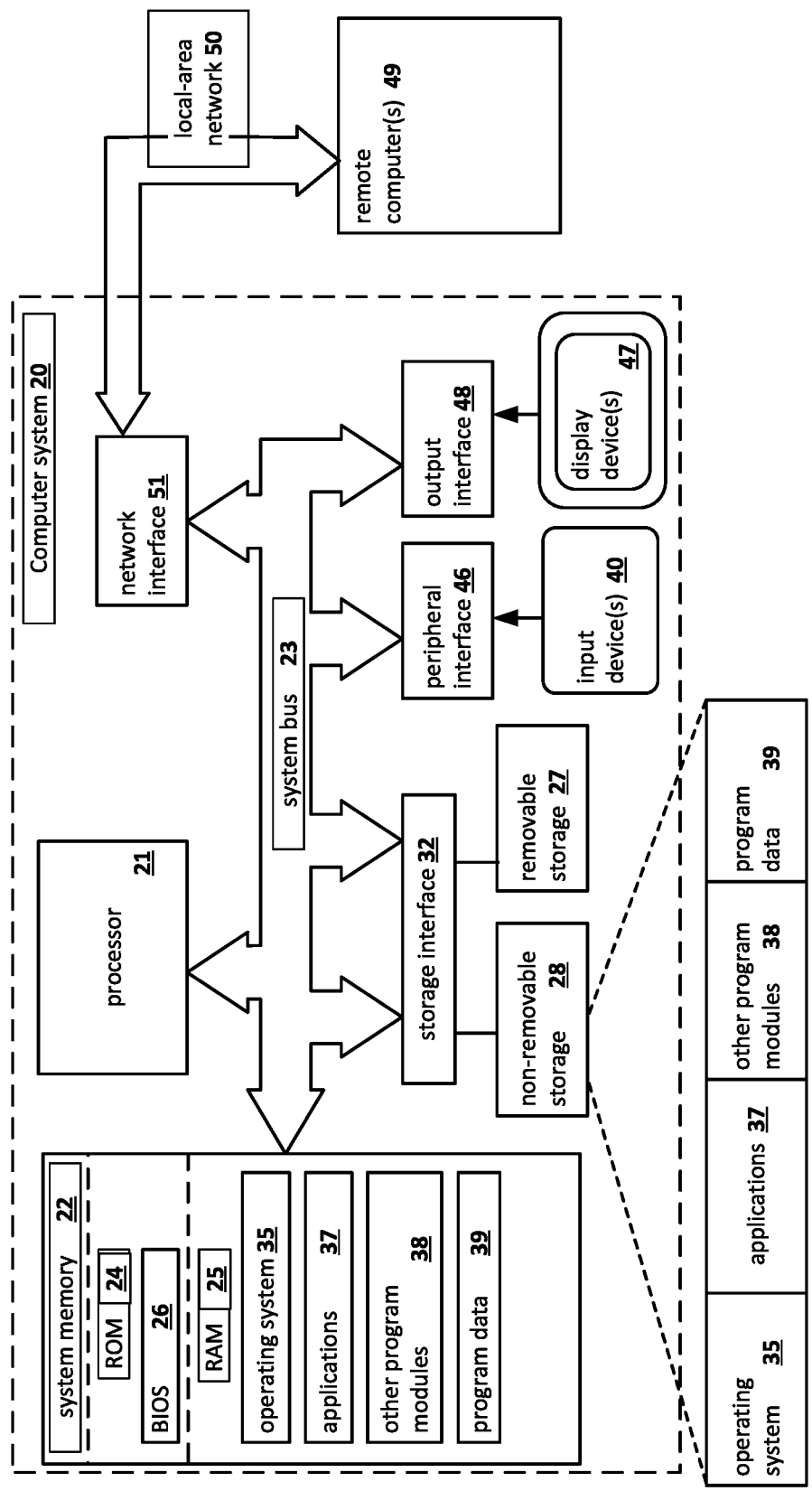
FIG. 6 presents an example of a general-purpose computer system on which aspects of the present disclosure can be implemented.

FIG. 6 is a block diagram illustrating a computer system 20 on which aspects of systems and methods for detecting malicious activity on a web server may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malicious activity on a web server, the method comprising:
    retrieving a first backup and a second backup of a web server from a backup archive that stores a plurality of backups of the web server, wherein the first backup was generated at a first time and the second backup was generated at a second time;
    detecting at least one change between the first backup and the second backup;
    determining whether the at least one change is associated with malicious activity based on a plurality of security rules and a plurality of machine learning models, by:
        determining a rule verdict on whether the at least one change violates one or more of the plurality of security rules;
        inputting a file corresponding to the at least one change in a first machine learning model configured to verify whether an input change originates from an authorized channel;
        inputting the file in a second machine learning model configured to verify if a webpage associated with the file is a phishing webpage;
        inputting the rule verdict, an output of the first machine learning model, and an output of the second machine learning model into a third machine learning model configured to generate a severity of malicious activity on the web server; and
    in response to determining that the severity is greater than a threshold severity, executing a rollback function of the web server to a backup that does not include the malicious activity.

2. The method of claim 1, wherein the file is an image, and wherein determining whether the at least one change is associated with the malicious activity further comprises:
    inputting the file in a fourth machine learning model configured to determine whether the file comprises an authentic logo; and
    inputting an output of the fourth machine learning model in the third machine learning model.

3. The method of claim 1, wherein determining whether the at least one change is associated with the malicious activity further comprises:
    inputting the file in a fifth machine learning model configured to determine whether the file comprises malicious binaries; and
    inputting an output of the fifth machine learning model in the third machine learning model.

4. The method of claim 1, wherein the web server comprises a plurality of websites, wherein each of the plurality of websites comprises one or more web pages, and wherein the first backup and the second backup comprise files of a specific website of the plurality of websites.

5. The method of claim 1, wherein detecting at least one change between the first backup and the second backup further comprises executing a sixth machine learning model that detects changes across one or more input backups.

6. The method of claim 1, wherein detecting at least one change between the first backup and the second backup comprises:
    detecting that a hash value of the file in the first backup differs from a hash value of the file in the second backup.

7. The method of claim 1, wherein detecting at least one change between the first backup and the second backup comprises:
    detecting that a file version number of the file in the first backup differs from a file version number of the file in the second backup.

8. The method of claim 1, further comprising:
    identifying a webpage associated with the file corresponding to the at least one change;
    executing the webpage in a sandbox;
    determining a verdict of whether the webpage comprises malicious activity; and
    inputting the verdict in the third machine learning model.

9. The method of claim 1, wherein the web server is part of a plurality of web servers, further comprising:
    identifying each web server of the plurality of web servers that comprises the file; and
    executing the rollback function on each of the plurality of web servers.

10. A system for detecting malicious activity on a web server, comprising:
    at least one memory;
    at least one hardware processor coupled with the at least one memory and configured, individually or in combination, to:
        retrieve a first backup and a second backup of a web server from a backup archive that stores a plurality of backups of the web server, wherein the first backup was generated at a first time and the second backup was generated at a second time;
        detect at least one change between the first backup and the second backup;
        determine whether the at least one change is associated with malicious activity based on a plurality of security rules and a plurality of machine learning models, by:
            determining a rule verdict on whether the at least one change violates one or more of the plurality of security rules;
            inputting a file corresponding to the at least one change in a first machine learning model configured to verify whether an input change originates from an authorized channel;
            inputting the file in a second machine learning model configured to verify if a webpage associated with the file is a phishing webpage;
            inputting the rule verdict, an output of the first machine learning model, and an output of the second machine learning model into a third machine learning model configured to generate a severity of malicious activity on the web server; and
        in response to determining that the severity is greater than a threshold severity, execute a rollback function of the web server to a backup that does not include the malicious activity.

11. The system of claim 10, wherein the file is an image, and wherein determining whether the at least one change is associated with the malicious activity further comprises:
inputting the file in a fourth machine learning model configured to determine whether the file comprises an authentic logo; and
inputting an output of the fourth machine learning model in the third machine learning model.

12. The system of claim 10, wherein determining whether the at least one change is associated with the malicious activity further comprises:
inputting the file in a fifth machine learning model configured to determine whether the file comprises malicious binaries; and
inputting an output of the fifth machine learning model in the third machine learning model.

13. The system of claim 10, wherein the web server comprises a plurality of websites, wherein each of the plurality of websites comprises one or more web pages, and wherein the first backup and the second backup comprise files of a specific website of the plurality of websites.

14. The system of claim 10, wherein detecting at least one change between the first backup and the second backup further comprises executing a sixth machine learning model that detects changes across one or more input backups.

15. The system of claim 10, wherein detecting at least one change between the first backup and the second backup comprises:
detecting that a hash value of the file in the first backup differs from a hash value of the file in the second backup.

16. The system of claim 10, wherein detecting at least one change between the first backup and the second backup comprises:
detecting that a file version number of the file in the first backup differs from a file version number of the file in the second backup.

17. The system of claim 10, further comprising:
identifying a webpage associated with the file corresponding to the at least one change;
executing the webpage in a sandbox;
determining a verdict of whether the webpage comprises malicious activity; and
inputting the verdict in the third machine learning model.

18. The system of claim 10, wherein the web server is part of a plurality of web servers, further comprising:
identifying each web server of the plurality of web servers that comprises the file; and
executing the rollback function on each of the plurality of web servers.

19. A non-transitory computer readable medium storing thereon computer executable instructions for detecting malicious activity on a web server, including instructions for:
retrieving a first backup and a second backup of a web server from a backup archive that stores a plurality of backups of the web server, wherein the first backup was generated at a first time and the second backup was generated at a second time;
detecting at least one change between the first backup and the second backup;
determining whether the at least one change is associated with malicious activity based on a plurality of security rules and a plurality of machine learning models, by:
determining a rule verdict on whether the at least one change violates one or more of the plurality of security rules;
inputting a file corresponding to the at least one change in a first machine learning model configured to verify whether an input change originates from an authorized channel;
inputting the file in a second machine learning model configured to verify if a webpage associated with the file is a phishing webpage;
inputting the rule verdict, an output of the first machine learning model, and an output of the second machine learning model into a third machine learning model configured to generate a severity of malicious activity on the web server; and
in response to determining that the severity is greater than a threshold severity, executing a rollback function of the web server to a backup that does not include the malicious activity.

* * * * *